(12) United States Patent
Lang et al.

(10) Patent No.: US 10,526,924 B2
(45) Date of Patent: Jan. 7, 2020

(54) THERMODYNAMIC CYCLE SYSTEM

(71) Applicant: Dow Global Technologies LLC, Midland, MI (US)

(72) Inventors: Christoph Lang, Kilchberg (CH); Martin R. Greaves, Baar (CH); Evelyn A. Zaugg-Hoozemans, Richterswil (CH)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 15/775,446

(22) PCT Filed: Nov. 2, 2016

(86) PCT No.: PCT/US2016/060040
§ 371 (c)(1),
(2) Date: May 11, 2018

(87) PCT Pub. No.: WO2017/083145
PCT Pub. Date: May 18, 2017

(65) Prior Publication Data
US 2018/0371957 A1    Dec. 27, 2018

Related U.S. Application Data

(60) Provisional application No. 62/254,788, filed on Nov. 13, 2015.

(51) Int. Cl.
*F01K 25/06* (2006.01)
*C08L 71/02* (2006.01)
*C10M 107/34* (2006.01)
*C09K 5/04* (2006.01)
*C10M 145/10* (2006.01)
*C10M 169/04* (2006.01)
*F01K 13/02* (2006.01)

(52) U.S. Cl.
CPC .............. *F01K 25/06* (2013.01); *C08L 71/02* (2013.01); *C09K 5/048* (2013.01); *C10M 107/34* (2013.01); *C10M 145/10* (2013.01); *C10M 169/041* (2013.01); *F01K 13/02* (2013.01); *C10M 2209/084* (2013.01); *C10M 2209/1045* (2013.01); *C10M 2209/1055* (2013.01); *C10M 2209/1075* (2013.01); *C10M 2215/064* (2013.01); *C10M 2215/065* (2013.01); *C10M 2215/223* (2013.01); *C10M 2219/044* (2013.01); *C10M 2223/041* (2013.01); *C10N 2220/021* (2013.01); *C10N 2220/022* (2013.01); *C10N 2230/02* (2013.01); *C10N 2240/14* (2013.01)

(58) Field of Classification Search
CPC .... F01K 25/06; F01K 13/02; C10M 169/041; C10M 145/10; C10M 107/34; C10M 2209/1055; C10M 2219/044; C10M 2215/223; C10M 2215/065; C10M 2215/064; C10M 2209/1075; C10M 2209/1045; C10M 2209/084; C10M 2223/041; C09K 5/048; C08L 71/02; C10N 2230/02; C10N 2240/14; C10N 2220/021; C10N 2220/022
USPC .................................................. 60/651, 671
See application file for complete search history.

(56) References Cited

U.S. PATENT DOCUMENTS

| | | | |
|---|---|---|---|
| 5,693,598 A * | 12/1997 | Abraham | C10M 141/10 508/404 |
| 2006/0192173 A1 | 8/2006 | Sunkara | |
| 2007/0043248 A1* | 2/2007 | Wu | C08F 10/14 585/521 |
| 2009/0042016 A1* | 2/2009 | Yoshida | B32B 3/26 428/317.9 |
| 2010/0009877 A1 | 1/2010 | Greaves | |
| 2010/0323937 A1* | 12/2010 | Wu | C08F 10/08 508/591 |
| 2015/0152749 A1 | 6/2015 | Nishiguchi et al. | |
| 2015/0240688 A1 | 8/2015 | Hoetger et al. | |

FOREIGN PATENT DOCUMENTS

| | | |
|---|---|---|
| JP | 2013100805 | 5/2016 |
| WO | 2014117156 | 7/2014 |

OTHER PUBLICATIONS

International Search Report & Written Opinion for related PCT Application PCT/US2016/060040, dated Feb. 1, 2017 (10 pgs).
International Preliminary Report on Patentability for related PCT Application PCT/US2016/060040, dated Oct. 17, 2017 (8 pgs).

* cited by examiner

*Primary Examiner* — Hoang M Nguyen
(74) *Attorney, Agent, or Firm* — Brooks, Cameron & Huebsch, PLLC

(57) ABSTRACT

A thermodynamic cycle such as an organic Rankine cycle system, utilizing a lubricant and a working fluid, for a machine in which pressurized gaseous working fluid is expanded to a lower pressure level and the energy from the fluid expansion is transformed into mechanical rotation energy; the lubricant includes a polyalkylene glycol based lubricant composition and the working fluid includes a mixture of alcohol and water.

16 Claims, No Drawings

THERMODYNAMIC CYCLE SYSTEM

This application is a National Stage Application under 35 U.S.C. § 371 of International Application Number PCT/US2016/060040, filed Nov. 2, 2016 and published as WO 2017/083145 on May 18, 2017, which claims the benefit to U.S. Provisional Application 62/254,788, filed Nov. 13, 2015, the entire contents of which are incorporated herein by reference in its entirety.

FIELD

The present invention pertains to a lubricant useful for a thermodynamic cycle system used for converting heat energy to mechanical energy; and particularly, for an organic Rankine cycle system which uses an aqueous alcohol mixture as a working fluid and a polyalkylene glycol as a lubricant.

BACKGROUND

In a simple Rankine cycle system, such as an automotive Rankine cycle engine system, there is a liquid pump for pumping a working fluid to a required boiler pressure, one or several heat exchangers for heating and evaporating the working fluid, one or more expansion machines for converting heat energy of the working fluid into mechanical energy, and a condenser for liquefying the working fluid vapors exhausted from the expansion machines.

One embodiment of an organic Rankine cycle system includes a working fluid and a lubricant which are separated and separately used in the system. The system is designed such that the working fluid and the lubricant are separated during a certain operation mode of the system. However, in another operation mode the working fluid and the lubricant do come into contact with each other. And, when the working fluid and the lubricant do come into contact with each other, the working fluid can dilute the lubricant; and the viscosity of the lubricant can be significantly reduced (e.g., to less than (<) 20 percent (%) of its initial value) rendering the use of the lubricant ineffective. When contact of the working fluid and the lubricant and dilution occurs, it is critical that the working fluid and the lubricant be miscible with each other because working fluids are known to have poor lubrication characteristics and this can cause severe wear and, in extreme cases, equipment damage.

In a Rankine cycle the mechanical parts of an engine transform the pressure of a working fluid into mechanical energy such as an expansion machine. The mechanical parts of the engine are required to be lubricated. One class of lubricant known in the art is a polyalkylene glycol (PAG) lubricant. Also known in the art is the use of an alcohol as a working fluid in a Rankine system. For example, a specific alcohol that is used as a working fluid can be ethanol. Currently, Rankine cycle systems are being designed such that the working fluid used in the system can be a mixture of water and alcohol such as ethanol; and wherein the water concentration in the working fluid is typically from 1 percent by weight or weight percent (wt %) to 50 wt %.

Combinations of PAGs as a lubricant and ethanol as a working fluid have been reported in WO2014/128266. The engines described in WO2014/128266 allow working fluid to enter the lubricant space and the PAGs are diluted with ethanol which reduces the viscosity of the PAGs, however if the viscosity of the lubricant is too low (e.g., <20% of its original value), friction and wear of the engine parts can increase to an unacceptable level resulting in wear debris and severe equipment damage. Wear and equipment damage are also possible when the viscosity of the lubricant is reduced to greater than (>) 50% of its original value. It is preferred that the viscosity is not reduced by >30% of its original value and most preferred if the viscosity change is <10% of its original value.

Machines with moving parts that deal with pressurized fluids (working fluids) such as pumps, compressors, and engines need lubrication of the moving parts. Heretofore, several different options have been used for providing such lubrication such as: (1) the working fluid used has minimal lubrication properties but is expected to perform some minimal lubrication; (2) the working fluid used is designed to contain additives (mainly lubricity additives) that are dissolved in the working fluid; (3) the lubricant and the working fluid are blended to form an emulsion as a single phase; and (4) the lubricant and the working fluid are physically separated by using a sealed system. Using option (4) in practice, usually results in the lubricant and the working fluid inadvertently coming into contact with each other.

As aforementioned, when the working fluid and lubricant are in contact, the viscosity of the lubricant can be significantly reduced rendering the use of the lubricant ineffective. For example, when the working fluid is an alcohol and water mixture and such working fluid contacts the lubricant, when the lubricant is for example a polyalkylene glycol, the viscosity of the lubricant is reduced to a greater extent (e.g., to up to about 75%).

The choice of working fluid used is normally based on the physical and thermal process requirements of the Rankine cycle system used. Typical working fluids include for example hydrofluorocarbons (HFCs), alcohols and alkanes which have good thermal properties but have poor lubrication properties. One disadvantage with options (2) to (3) above is that the working fluid cannot be used in systems where high temperatures (e.g., greater than [>]150° C.) are experienced because the lubricant or lubricant additives can degrade quickly at these temperatures such that acceptable maintenance intervals cannot be achieved. Therefore, for systems with temperatures over 150° C. option (4) above is a preferred option of choice. However, with use of option (4), the lubricant needs to provide wear protection of the moving parts of the system across the operating temperature range. But one disadvantage with option (4) is that the physical sealed system separating the lubricant and the working fluid can fail or working fluid and lubricant are blended when the system shuts down; and then the working fluid can enter the area of system containing the lubricant. This can affect the viscosity and the wear protection of the lubricant. For example, if the viscosity of the lubricant is reduced too much (e.g., to <80% of its original value), then the lubricant film cannot fully separate moving mechanical parts and wear of surfaces occurs in the system.

In automotive Rankine cycles alcohols and HFCs are often the working fluids of choice because the thermal properties of the alcohols and HFCs maximize efficiency and minimize equipment cost. See for example the description in Dieter Seher et. al., "Waste Heat Recovery for Commercial Vehicles with a Rankine Process", 21st Aachen Colloquium Automobile and Engine Technology 2012. Most common lubricants such as mineral oils, polyalpha-olefins, alkylated naphthalenes, and some esters are not miscible with the alcohol and HFC working fluids (especially HFCs). In this case, the working fluid can displace the lubricant on critical parts to be lubricated in the equipment (e.g., shafts, cylinders, bearings etc.) and this can increase friction and wear of the critical parts that can lead to equipment failure.

However, even if a working fluid that dissolves in the lubricant is selected, such working fluid may negatively affect other properties of the lubricant, for example, the viscosity of the lubricant can be lowered (e.g., to <80% of its original value) to the detriment of the equipment.

SUMMARY

The industry is considering working fluids that are water/alcohol mixtures. It has been discovered that the addition of from about 20 wt % to about 50 wt % of water to the working fluid reduces the viscosity drop (percent of original viscosity when diluted with working fluid) of the lubricant when contaminated with working fluid particularly when certain polyalkylene glycol chemistries are used as lubricants. In addition, it has been discovered that a polyalkylene glycol (PAG) is an advantageous choice as a lubricant for a Rankine cycle system. PAGs that are copolymers and which contain ethoxy units are especially useful in the present invention. PAGs have several attractive benefits including for example, (1) good thermo-oxidative stability such that PAGs can operate at temperatures of up to about 200° C.; (2) PAGs and alcohols are miscible and can lead to a film on the lubricated parts of the machine used in a thermodynamic cycle; (3) PAGs can have a viscosity index of over 200 and a low pour point (e.g., to <-25° C. as measured using the procedure in ASTM D97 (2012); (4) PAGs may also be soluble in water; and (5) PAGs can have high volumetric heat capacities (e.g., >2.0 J/g/K at 40° C.).

The present invention is directed to the use of PAGs derived from alkylene oxides such as ethylene oxide (EO) and propylene oxide (PO) copolymers as the lubricant. The alkylene oxide polymers can be random, block, or reverse block copolymers. In a preferred embodiment, the polymers are those with a weight average molecular weight (M.W.) between about 500 grams per mole (g/mol) and about 4,300 g/mol and an EO content of 10 wt % or higher. It is envisioned that propylene oxide can be replaced with other higher oxides such as 1,2-butylene oxide, 2,3-butylene oxide, octene oxide and dodecene oxide to give copolymers with ethylene oxide that give a similar effect.

The present invention is also directed to the use of a working fluid comprising an aqueous alcohol mixture and up to 50 wt % water. Using the above aqueous alcohol mixture helps improve the viscosity stability of the lubricant than when alcohol alone is used as the working fluid. It has been shown that when the working fluid contains water and an alcohol, the viscosity change (ΔV) of the lubricant can be, for example, from about 10% to about 23% lower than when the working fluid is alcohol alone and the working fluid dilutes the lubricant.

Another embodiment of the present invention includes a special formulated PAG based lubricant that also contains a polyacrylate additive (up to about 1%). The inclusion of the polyacrylate in the PAG further improves the viscosity control of the PAG when diluted with an aqueous alcohol working fluid.

The lubricant can be combined with one or more different additives to improve properties of the lubricant, including for example, the properties of wear, oxidative stability, corrosiveness, pressure performance, de-foaming, and/or a combination of the above properties.

DETAILED DESCRIPTION

The "viscosity change" or "viscosity drop" abbreviated "ΔV" of the lubricant herein means the percentage change between the initial viscosity value of the lubricant and its value when diluted with working fluid.

"Lubricity" or "lubrication" herein means a reduction of friction between two contacting surfaces by means of a fluid or lubricant.

"Viscosity index" abbreviated "V.I.", with reference to a composition, herein means the change in viscosity between 40° C. and 100° C. as calculated using ASTM D2270. Products with a high viscosity index have values above 150 (unitless).

"Low pour point" with reference to a composition, herein means values that are below about -40° C.

"Good thermo-oxidative stability" herein means the viscosity of the lubricant after the modified ASTM D2893 (originally published in 2004 and revised in 2014) (at 150° C. for 8 weeks) is maximum 10% bigger or smaller than the original viscosity of unused lubricant.

"Water soluble", with reference PAGs, herein means PAGs which form a clear homogenous mixture when viewed with the naked eye and when mixed at ambient temperature at concentrations of from about 5 wt % to about 25 wt % of PAG in deionized water.

In its broadest scope, the present invention includes a working fluid composition and a lubricant composition, two separate compositions which are used in a Rankine cycle system or machine in which pressurized working fluid is expanded to a certain pressure and the energy from the working fluid expansion is transformed into mechanical rotation energy. For example, the pressurized working fluid can be expanded to a pressure of from about 0.01 bars gauge (barg) to about 10 barg in one embodiment, from about 0.1 barg to about 5 barg in another embodiment, and from about 1 barg to about 2.5 barg in still another embodiment.

In a preferred embodiment, the working fluid composition may include for example a mixture of alcohol and water; and the lubricant composition can be for example a PAG or a combination of two or more PAGs as the lubricant.

Generally, the alcohol useful in the present invention can be any alcohol. For example, in a preferred embodiment, the alcohol used in the present invention can be ethanol, propanol, iso-propanol, butanol, iso-butanol, and mixtures thereof.

The concentration of alcohol used in the working fluid of the present invention may range generally from about 10 wt % to about 99 wt % in one embodiment, from about 20 wt % to about 80 wt % in another embodiment, and from about 50 wt % to about 80 wt % in still another embodiment, based on the total weight of alcohol and water in the working fluid. If the ethanol concentration is lower than 10 wt %, freezing of the working fluid could occur in the winter temperatures. If the ethanol concentration is greater than 99 wt %, the benefit of a viscosity drop may be uneconomical.

The alcohol in the aqueous alcohol mixture is advantageously soluble in the water of the aqueous alcohol mixture. To maintain the solubility property of the alcohol and water, the molecular weight of the alcohol in the aqueous alcohol can generally have, for example, a molecular weight of less than about 110 g/mol in one embodiment; from about 30 g/mol to about 80 g/mol in another embodiment; and from about 40 g/mol to about 60 g/mol in still another embodiment. When the molecular weight of the alcohol is too high, i.e., greater than about 110 g/mol, then the alcohol may not be soluble in water.

Generally, the water can be any type of water. For example, in a preferred embodiment, the water used in the present invention can be distilled water, deionized water, and mixtures thereof. The water can be essentially any type of water that does not deleteriously affect the organic Rankine system. For example, tap water, sea water or well water are undesirable because such type of water may release salts that may lower heat transfer at the evaporator of an organic Rankine system.

The concentration of water used in the working fluid of the present invention may range generally from about 1 wt % to about 99 wt % in one embodiment, from about 20 wt % to about 80 wt % in another embodiment, and from about 25 wt % to about 50 wt % in still another embodiment, based on the total weight of alcohol and water in the working fluid.

The process and type of equipment used to prepare the working fluid includes blending or mixing of the above components in conventional mixing equipment or vessels known in the art. For example, the preparation of the working fluid of the present invention is achieved by blending, in known mixing equipment, the alcohol composition and water. Due to the limited thermal and thermo oxidative stability of the alcohol, it may be possible or desired to add additives to the working fluid such as anti-oxidants to increase its stability. Optionally, other desirable additives such as corrosion inhibitors and foam control agents may be present in the working fluid. For example, optional additives can be added to the working fluid at a concentration of from 0 wt % to about 10 wt % in one embodiment and from about 0.05 wt % to about 10 wt % in another embodiment. In still another embodiment, the optional additives in the working fluid can be maintained at <about 1,000 ppm.

All the above compounds of the working fluid are typically mixed and dispersed in a vessel at a temperature enabling the preparation of an effective working fluid. For example, the temperature during the mixing of the above components may be generally from about 10° C. to about 40° C. in one embodiment, and from about 20° C. to about 30° C. in another embodiment.

The preparation of the working fluid of the present invention, and/or any of the steps thereof, may be a batch or a continuous process. In a preferred embodiment, the mixing process of the working fluid components and the mixing equipment used in the process may be any agitated vessel and ancillary equipment well known to those skilled in the art.

In general, the lubricant may be selected from the group consisting of mineral oil, silicone oil, polyalkyl benzenes (PABs), polyol esters (POEs), polyalkylene glycols (PAGs), polyalkylene glycol esters (PAG esters), polyvinyl ethers (PVEs), poly (alpha-olefins), and combinations thereof.

PAGs are a good choice as a lubricant for Rankine cycles. The PAGs may include the following benefits: (1) PAGs have good thermo-oxidative stability; (2) PAGs and alcohols are miscible and the use of this combination of compounds can lead to a film on the lubricated parts of the machine; (3) PAGs may also be water soluble, and (4) PAGs can have a viscosity index of over 200 and a low pour point.

Generally, the polyalkylene glycol used in the composition may include for example one or more of random, block or reverse block polyalkylene glycols derived from ethylene oxide and propylene oxide feed stocks; and mixtures thereof.

In a more preferred embodiment, the PAG useful in the composition of the present invention may include for example, two PAGs in combination such as a combination of any random, block or reverse block copolymers of ethylene oxide and propylene oxide.

The polyalkylene glycols may contain ethoxy ($CH_2CH_2O$—) groups in the structure and can be present in the lubricant in a concentration of generally from about 10 wt % to about 90 wt % in one embodiment, from about 20 wt % to about 80 wt % in another embodiment, and from about 40 wt % to about 60 wt % in still another embodiment, based on the total weight of the components in the lubricant. If the concentration of the ethoxy is greater than 90 wt %, the viscosity index increases but the pour point increases as well. If the concentration of the ethoxy is less than 10 wt %, the water solubility is reduced which can lead to phase separation.

The polyalkylene glycols may contain propoxy [$CH_2CH(CH_3)O$—] groups in the structure which can be present in the lubricant in a concentration of generally from about 10 wt % to about 90 wt % in one embodiment, from about 20 wt % to about 80 wt % in another embodiment, and from about 40 wt % to about 60 wt % in still another embodiment, based on the total weight of the components in the lubricant. If the concentration of the propoxy is greater than 90 wt %, the water solubility in the lubricant is decreased which could lead to phase separation.

In general, the PAGs can be selected for example from the group consisting of random copolymers, block copolymers, reverse block copolymers, or mixtures thereof. One preferred embodiment of the PAG polymers used in the present invention are those with a weight average molecular weight between about 500 g/mol and about 4,300 g/mol and an ethoxy content of 10 wt % or higher. In another preferred embodiment, the polyalkylene glycols may be those containing at least one copolymer of ethylene oxide and propylene oxide and in which the lubricant has a kinematic viscosity at 40° C. that may be from about 50 $mm^2$/sec to about 300 $mm^2$/sec when undiluted.

As aforementioned, the preferred polymers making up the lubricant formulation are those that contain an ethoxy content of 10 wt % or higher in one embodiment, an ethoxy content of 15 wt % or higher in another embodiment, and an ethoxy content of greater than about 30 wt % in another embodiment.

In another embodiment, the lubricant formulation may contain generally from about 0.01 wt % to about 1 wt % of a polyacrylate in one embodiment; from about 0.02 to about 0.5 in another embodiment; and from about 0.05 to about 0.2 in still another embodiment. When the polyacrylate is used above 1% gelling of the fluid can occur. But when used at less than 0.01% it provides less viscosity control.

The process and type of equipment used to prepare the lubricant formulation includes blending or mixing of the above components in conventional mixing equipment or vessels known in the art. For example, the preparation of the lubricant of the present invention is achieved by blending, in known mixing equipment, the PAGs together, and optionally any other desirable additives.

All the above compounds of the lubricant are typically mixed and dispersed in a vessel at a temperature enabling the preparation of an effective lubricant. For example, the temperature during the mixing of the above components may be generally from about 20° C. to about 80° C. in one embodiment, and from about 40° C. to about 60° C. in another embodiment.

The preparation of the lubricant of the present invention, and/or any of the steps thereof, may be a batch or a continuous process. In a preferred embodiment, the mixing process of the lubricant components and the mixing equipment used in the process may be any vessel and ancillary equipment well known to those skilled in the art.

The working fluid of the above composition prepared by the above process of the present invention exhibits several unexpected and unique properties. For example, the viscosity of working fluid composition of the present invention is such that the composition can be easily handled and processed. The working fluid composition may have a dynamic viscosity at 25° C. in the range of from about 0.1 mPa-s to about 10 mPa-s in one embodiment, from about 0.2 mPa-s to about 5 mPa-s in another embodiment, and from about 0.5 mPa-s to about 2 mPa-s in still another embodiment. Working fluids with higher viscosities than 10 mPa-s and with similar boiling point as the working fluid of the present invention may be useful in an organic Rankine cycle application. However, working fluids with a higher viscosity than 10 mPa-s also may have a higher boiling point than the working fluid of the present invention, which is not suitable in an organic Rankine cycle application. Working fluids with a viscosity of lower than 0.1 mPa-s would worsen the lubrication and thus are undesirable.

Another property that the working fluid composition exhibits is the boiling point. Generally, the boiling point of the working fluid can be between 0° C. and 250° C. in one embodiment, between about 30° C. and 170° C. in another embodiment, and between about 60° C. and 120° C. in still another embodiment.

The polyalkylene glycol based lubricant composition (the lubricant formulation) prepared by the above process of the present invention exhibits several unexpected and unique properties. For example, the kinematic viscosity of the polyalkylene glycol based lubricant composition of the present invention is such that the composition can be easily handled and processed. The polyalkylene glycol based lubricant composition may have a kinematic viscosity at 40° C. in the range of from about 10 mm$^2$/s to about 1,000 mm$^2$/s in one embodiment, from about 50 mm$^2$/s to about 500 mm$^2$/s in another embodiment, and from about 100 mm$^2$/s to about 250mm$^2$/sec in still another embodiment. If the kinematic viscosity of the lubricant is too low, i.e., less than about 50 mm$^2$/s at 40° C., then there is a greater risk of excessive wear in equipment which can occur. If the kinematic viscosity of the lubricant is too high, i.e., greater than about 300 mm$^2$/s at 40° C., then the risk of viscous drag on moving parts can be high leading to a higher energy consumption.

The molecular weight of the polyalkylene glycol copolymer generally may be from about 500 g/mol to about 5,000 g/mol in one embodiment; from about 500 g/mol to about 4,300 g/mol in another embodiment; and from about 1,500 g/mol and about 2,500 g/mol in still another embodiment.

Another property that the polyalkylene glycol based lubricant composition exhibits is good low temperature properties. For example, generally the property of pour point can be between about −70° C. and about 0° C. in one embodiment, between about −60° C. and about −10° C. in another embodiment, and between about −50° C. and about −25° C. in still another embodiment. If the pour point is too high, the lubricant can become very viscous in cold temperature climates making the lubricant's pumpability difficult. Therefore, lower pour points are preferred.

The PAGs useful in the present invention also have good thermo-oxidative stability and can operate for example at temperatures of up to 200° C. Generally, the operating temperature of the PAGs may be from about 50° C. to about 200° C. in one embodiment, from about 80° C. to about 170° C. in another embodiment, and from about 100° C. to about 150° C. in still another embodiment.

One of the benefits of using the PAGs of the present invention is that the PAGs and aqueous alcohol mixtures are miscible. The terms miscible and immiscible are used herein as commonly used in the art. For example the term "miscible" herein means that two components, which in this case are the PAG and the aqueous alcohol working fluid is a physical blend, i.e., the two components: (1) maintain a single phase for a period of at least 24 hours at ambient temperature, and (2) during the same time period, the two components do not exhibit turbidity. If the two components exhibit any turbidity or separation then the two components are immiscible. For example, the miscibility of the PAGs and aqueous alcohol may be from about 10 wt % to about 90 wt % in one embodiment, and from about 10 wt % to about 50 wt % in another embodiment. The term "soluble" implies the PAG and the aqueous alcohol working fluid form a clear homogenous mixture at ambient temperature when mixed but at a certain concentration of aqueous alcohol working fluid in the PAG. For example, the solubility of the working fluid in the PAG may be from about 5 wt % to about 50 wt % in one embodiment, and from about 10 wt % to about 50 wt % in another embodiment. If a clear and homogenous mixture is not observed, the working fluid in the PAG is considered as not being soluble PAGs are generally described in the art as either water soluble, water insoluble or oil soluble. Examples of water soluble PAGs are copolymers of ethylene oxide and propylene oxide where the ethylene oxide is usually greater than about 20 wt %. Examples of water insoluble PAGs are homo-polymers of propylene oxide. Examples of oil soluble polyalkylene glycols are homo-polymers of butylene oxide. A description of each class of PAGs can be found in "Synthetics, Mineral Oils and Bio-Based lubricants", Chapter 6, Polyalkylene glycols, Martin R. Greaves, CRC press, edited by L. R. Rudnick. Chapter 6 of the above reference also includes descriptions of random, block and reverse block PAG structures.

After the working fluid formulation and the polyalkylene glycol lubricant formulation are prepared as described above, the working fluid and the lubricant are ready for use in a thermodynamic cycle, i.e., in a process for converting heat energy into mechanical energy. In general such process includes the steps of: (a) providing a thermodynamic cycle; (b) providing an aqueous alcohol as a working fluid for the cycle; (c) providing a lubricant formulation for the cycle; and (d) controlling the kinematic viscosity of the lubricant formulation by using at least one PAG copolymer resin in the lubricant formulation and wherein the lubricant formulation contains an ethylene oxide content of greater than about 10 weight percent.

For example, the thermodynamic cycle can be an organic Rankine cycle; and the organic Rankine cycle can be used in mobile equipment (e.g., an automobile) or in static equipment (e.g., a turbine in a power plant). The lubricant formulation may be used in any machine portion of the thermodynamic cycle that requires lubrication. For example, the lubricant formulation can be introduced into the expansion machine portion of the thermodynamic cycle. In one embodiment, the expansion machine can be a reciprocating or piston expansion machine; and the piston expansion machine may also include a swash plate design.

In another embodiment, the expansion machine can be, but not limited to, a centrifugal or axial flow turbine, a scroll-type expander, a rotary screw expander, a rotary-vane expander or a Wankel expander, and the like, and combinations thereof. The expansion machine can be part of an organic Rankine cycle.

In one preferred embodiment, for example, the machine to be lubricated can be an engine which is part of an organic Rankine cycle system that converts the energy from hot exhaust gases of an automobile engine such as a truck engine into mechanical energy to bring additional power to a truck crankshaft which saves fuel and reduces carbon dioxide ($CO_2$) emissions. The working fluid of this cycle runs at approximate 230° C. maximum and the lubricant to maximum 150° C. The engine can be a regular type piston expansion machine (expander) or a piston expansion machine with a swash-plate design. The swash plate design is known to be used in automotive air conditioning compressors. Unlike the expansion machine where the energy of compressed gaseous working fluid is converted to mechanical energy the compressor works vice versa. Mechanical energy is used to compress a working fluid which is in the gaseous phase.

EXAMPLES

The following Examples and Comparative Examples further illustrate the present invention in more detail but are not to be construed to limit the scope thereof.

In the following Examples and Comparative Examples, various materials, terms and designations are used and are explained as follows:

"PAG" stands for polyalkylene glycol.
"EtOH" stands for ethanol at 99.9 wt % purity.
"wt %" stands for weight percent.

"M.W." or "Mw" stands for weight average molecular weight.

"Kin. visc." stands for kinematic viscosity.

"V.I." stands for viscosity index.

In the following Examples and Comparative Examples, the following random copolymers described in Table I were used; and the usefulness of the random copolymers in the present invention were evaluated:

Examples 1-36 and Comparative Examples A-U

Examples of the present invention (Examples 1-36) and comparative examples (Comparative Examples A-U) are described herein in Tables IV-VI. All examples that use compositions in which ethanol alone is used as the working fluid are comparative examples. All examples that use compositions in aqueous ethanol mixtures as the working fluid are examples of the present invention.

TABLE I

| Component | Chemistry Description of Component | Supplier of Component |
|---|---|---|
| SYNALOX ™ 50-15B | A butanol initiated random copolymer of 50 wt % ethylene oxide and 50 wt % propylene oxide with a kin. visc. of 4.8 mm$^2$/s at 100° C.; an average M.W. of 500 g/mol; and a V.I. of 172. | The Dow Chemical Company |
| SYNALOX ™ 50-30B | A butanol initiated random copolymer of 50 wt % ethylene oxide and 50 wt % propylene oxide with a typical kin. visc. of 11 mm$^2$/s at 100° C.; an average M.W. of 1000 g/mol; and a V.I. of 211. | The Dow Chemical Company |
| SYNALOX ™ 50-100B | A butanol initiated random copolymer of 50 wt % ethylene oxide and 50 wt % propylene oxide with a typical kin. visc. of 27 mm$^2$/s at 100° C.; an average M.W. is 1,900 g/mol; and a V.I. of 230. | The Dow Chemical Company. |
| SYNALOX ™ 50-155B | A butanol initiated random copolymer of 50 wt % ethylene oxide and 50 wt % propylene oxide with a typical kin. visc. of 45 mm$^2$/s at 100° C.; an average M.W. of 2,500 g/mol; and a V.I. of 241. | The Dow Chemical Company |
| UCON ™ 75-H-90,000 | A diol initiated random copolymer of 75 wt % ethylene oxide and 25 wt % propylene oxide with a typical kin. visc. of 2,545 mm$^2$/s at 100° C.; an average M.W. of 12,000 g/mol; and a V.I. of 414. | The Dow Chemical Company |

In the following Examples and Comparative Examples, the following block and reverse block copolymers described in Table II were used; and the usefulness of the block copolymers in the present invention were evaluated:

As described in Tables IV, Formulations of Runs 1-5 contain an additive package (2.35% by weight) that is added to the PAG base oil. The additive package is described in Table VII. Formulations of Runs 6 and 7 described in Table

TABLE II

| Component | Chemistry Description of Component | Supplier of Component |
|---|---|---|
| DOWFAX ™ DF-107 | A diol initiated reverse block copolymer of 14 wt % ethylene oxide and 86 wt % propylene oxide with a typical kin. visc. of 35 mm$^2$/s at 100° C.; an average M.W. of 2,800 g/mol; and a V.I. of 211. | The Dow Chemical Company |
| DOWFAX ™ DF-117 | A triol initiated block copolymer of 9 wt % ethylene oxide and 81 wt % propylene oxide with a typical kin. visc. of 46 mm$^2$/s at 100° C.; an average M.W. of 4,300 g/mol; and a V.I. of 208. | The Dow Chemical Company |
| DOWFAX ™ 63N30 | A diol initiated block copolymer of 30 wt % ethylene oxide and 70 wt % propylene oxide with a typical kin. visc. of 30 mm$^2$/s at 100° C.; an average M.W. of 2,100 g/mol; and a V.I. of 180. | The Dow Chemical Company |
| DOWFAX ™ 100N15 | Diol initiated block copolymer of 16 wt % ethylene oxide and 84 wt % propylene oxide with a typical kin. visc. of 48 mm$^2$/s at 100° C.; an average M.W. of 3,800 g/mol; and a V.I. of 184. | The Dow Chemical Company |

The following additives described in Table III were used to prepare the lubricant formulations:

IV do not contain an additive package. Similarly, in Tables V and VI, Formulations of Runs 8-12 and Formulations of

TABLE III

| Component | Chemistry Description of Component | Supplier of Component |
|---|---|---|
| Irganox ® L57 | Anti-oxidant: octylated/butylated diphenylamine | BASF |
| Irganox ® L06 | Anti-oxidant: N-[(1,1,3,3-tetramethylbutyl)phenyl] naphthalin-1-amine | BASF |
| NA-SUL ® CA-1082 | Rust and corrosion inhibitor for lubricants: calcium alkylnaphthalenesulfonate/carboxylate complex 60%-70% | King Industries, Inc. |
| Irgamet ® TTZ | Yellow metal passivator: tolyltriazole | BASF |
| DURAD ™ 310M | Extreme pressure additive: phenol, isopropylated, phosphate (3:1) [triphenyl phosphate < 11%] | Chemtura Manufacturing UK Limited |
| FAVOR ™ SXM 9155 POLYACRYLATE | Cross-linked sodium polyacrylate, particle size: 150 microns (μm) to 850 μm | Evonik |

Runs 15-19, respectively, contain the additive package described in Table VII; and Formulations of Runs 13 and 14 of Table V and Runs 20 and 21 of Table VI do not contain an additive package.

In general, the Examples show that when water is included in the working fluid, the viscosity of the lubricant is reduced less than in the absence of water when the lubricant and working fluid are mixed. Furthermore the Examples show that a higher water proportion in the working fluid improves the viscosity stability of the polyalkylene glycol based lubricant when the lubricant is diluted with working fluid.

Testing—General Procedure

The following three working fluids were prepared and tested: (1) pure ethanol (EtOH); (2) a blend of 80 wt % EtOH and 20 wt % water (EtOH/water: 80/20 wt %); and (3) a blend of 50 wt % EtOH and 50 wt % water (EtOH/water: 50/50 wt %).

The following PAG lubricant formulations were diluted with 5 wt %, 10 wt % and 30 wt % working fluid and the kinematic viscosity of the PAG lubricant formulations was measured via a Stabinger Viscometer™ SVM 3000 according to ASTM D7042 (originally published 2004 and revised 2014). The measurements were done at various temperatures; however, to illustrate the present invention, the data at 40° C. temperature was used. The percentage viscosity change is reported in Tables IV to VI. The percentage viscosity is calculated by measuring the kinematic viscosity of the diluted formulation and then divided by the viscosity of the undiluted formulation and subtracting this number from 1. The results of the testing are shown in Tables IV to VI.

It is desirable that the viscosity loss of the PAG lubricant formulations is minimal The greater the viscosity loss, then the greater is the probability of wear occurring inside the equipment.

The Examples herein show that a lubricant can be diluted with 5 wt % working fluid (Table IV); and that the lubricant can also be diluted with up to 10 wt % working fluid (Table V) and up to 30 wt % working fluid (Table VI). Although examples are not provided herein, in some cases, it may even be possible to dilute the lubricant with up to 50 wt % working fluid. However, the Examples of the present invention exhibit a dilution effect at 5 wt %, 10 wt % and 30 wt % as described in Tables IV to VI, respectively.

TABLE IV 5 wt % Dilution of Lubricant with Working Fluid

| | | Kin. visc. (mm$^2$/sec) at 40° C. of undiluted | Kin. visc. (mm$^2$/sec) at 40° C. change at 5 wt % dilution with the following working fluids: | | |
|---|---|---|---|---|---|
| Run No. | Formulations Base Oil Composition | material (mm$^2$/s) | EtOH Comparative Examples A-G | EtOH/water: 80/20 wt % Examples 1-5 | EtOH/water: 50/50 wt % Examples 6-12 |
| 1 | 42 wt % Synalox 50-155B + 58 wt % Synalox 50-100B | 179.1 | −33$^{(1)}$% | −26$^{(1)}$% | −16$^{(1)}$% |
| 2 | 89 wt % Synalox 50-155B + 11 wt % Synalox 50-15B | 188.7 | −28% | −18% | −11% |
| 3 | 77 wt % Dowfax 100N15 + 23 wt % Synalox 50-15B | 212.1 | −31% | −29% | −19% |
| 4 | Dowfax DF 107 | 248.6 | −26% | −16% | −14% |
| 5 | 97 wt % Synalox 50-100B + 3 wt % UCON 75-H-90000 | 171.5 | −25% | −19% | −15% |
| 6 | 80 wt % Dowfax DF 117 + 20 wt % Synalox 50-30B | 239.1 | −36% | — | −22% |
| 7 | 65 wt % Dowfax 63N30 + 26 wt % Synalox 50-15B + 9 wt % Synalox 50-30B | 100.4 | −33% | — | −17% |

Note for Table IV:
$^{(1)}$The negative values indicate the percentage viscosity reduction when the working fluid is added to the virgin lubricant.

TABLE V 10 wt % Dilution of Lubricant with Working Fluid

| | | Kin. visc. (mm$^2$/sec) at 40° C. of undiluted | Kin. visc. (mm$^2$/sec) at 40° C. change at 10 wt % dilution with the following working fluids: | | |
|---|---|---|---|---|---|
| Run No. | Formulations Base Oil Composition | material (mm$^2$/s) | EtOH Comparative Examples H-N | EtOH/water: 80/20 wt % Examples 13-17 | EtOH/water: 50/50 wt % Examples 18-24 |
| 8 | 42 wt % Synalox 50-155B + 58 wt % Synalox 50-100B | 179.1 | −53$^{(1)}$% | −44$^{(1)}$% | −32$^{(1)}$% |
| 9 | 89 wt % Synalox 50-155B + 11 wt % Synalox 50-15B | 188.7 | −44% | −36% | −25% |

TABLE V-continued 10 wt % Dilution of Lubricant with Working Fluid

| | | Kin. visc. (mm²/sec) at 40° C. of undiluted material (mm²/s) | Kin. visc. (mm²/sec) at 40° C. change at 10 wt % dilution with the following working fluids: | | |
|---|---|---|---|---|---|
| | | | EtOH | EtOH/water: 80/20 wt % | EtOH/water: 50/50 wt % |
| Run No. | Base Oil Composition | | Comparative Examples H-N | Examples 13-17 | Examples 18-24 |
| 10 | 77 wt % Dowfax 100N15 + 23 wt % Synalox 50-15B | 212.1 | −45% | −38% | −29% |
| 11 | Dowfax DF 107 | 248.6 | −48% | −35% | −25% |
| 12 | 97 wt % Synalox 50-100B + 3 wt % UCON 75-H-90000 | 171.5 | −40% | −29% | −27% |
| 13 | 80 wt % Dowfax DF 117 + 20 wt % Synalox 50-30B | 239.1 | −58% | — | −37% |
| 14 | 65 wt % Dowfax 63N30 + 26 wt % Synalox 50-15B + 9 wt % Synalox 50-30B | 100.4 | −53% | — | −30% |

Note for Table V:
[1] The negative values indicate the percentage viscosity reduction when the working fluid is added to the virgin lubricant.

TABLE VI 30 wt % Dilution of Lubricant with Working Fluid

| | | Kin. visc. (mm²/s) at 40° C. of undiluted material (mm²/s) | Kin. visc. (mm²/sec) change at 40° C. at 30 wt % dilution with the following working fluids: | | |
|---|---|---|---|---|---|
| | | | EtOH | EtOH/water: 80/20 wt % | EtOH/water: 50/50 wt % |
| Run No. | Base Oil Composition | | Comparative Examples O-U | Examples 25-29 | Examples 30-36 |
| 15 | 42 wt % Synalox 50-155B + 58 wt % Synalox 50-100B | 179.1 | −86[1]% | −80[1]% | −71[1]% |
| 16 | 89 wt % Synalox 50-155B + 11 wt % Synalox 50-15B | 188.7 | −80% | −74% | −65% |
| 17 | 77 wt % Dowfax 100N15 + 23 wt % Synalox 50-15B | 212.1 | −83% | −77% | −66% |
| 18 | Dowfax DF 107 | 248.6 | −84% | −75% | −67% |
| 19 | 97 wt % Synalox 50-100B + 3 wt % UCON 75-H-90000 | 171.5 | −81% | −67% | −65% |
| 20 | 80 wt % Dowfax DF 117 + 20 wt % Synalox 50-30B | 239.1 | −88% | — | −74% |
| 21 | 65 wt % Dowfax 63N30 + 26 wt % Synalox 50-15B + 9 wt % Synalox 50-30B | 100.4 | −85% | — | −68% |

Note for Table VI:
[1] The negative values indicate the percentage viscosity reduction when the working fluid is added to the virgin lubricant.

The Formulations of Runs 1-5 described in Table IV, Runs 8-12 described in Table V, and Runs 15-19 described in Table VI contain the additive package described in Table VII. The Formulations of Runs 6 and 7 described in Table IV, Runs 13 and 14 described in Table V, and Runs 20 and 21 described in Table VI do not contain an additive package such as described in Table VII.

TABLE VII

| Component | Concentration |
|---|---|
| Base oil | 97.65 wt % |
| Irganox L57 | 0.5 wt % |
| Irganox L06 | 0.5 wt % |
| NaSul Ca 1082 | 0.9 wt % |
| Irgamet ® TTZ | 0.1 wt % |
| Durad 310M | 0.35 wt % |

General Blending Procedure

The formulations were blended in a 500 mL glass beaker. 150 g of each formulation was made. The components were added in the same sequence as listed above. The base fluids were heated and stirred until a clear homogeneous solution was formed.

General Dilution Procedure

The dilution with working fluid was performed with 50 g blends. A stirrer was used at ambient temperature (about 23° C.) until the sample was clear.

Results of Dilution Tests

Tables IV to VI show examples of the viscosity decrease of PAG based formulations when water/ethanol mixtures are added to the formulation of the present invention including Examples 1-36. The formulations with pure ethanol are Comparative Examples A-U.

The blends with 50/50 wt % water/ethanol (Examples 1-5 of Table IV, Examples 13-17 of Table V and Examples 25-29 of Table VI) show less viscosity decrease than the blends with 20/80 wt % water/ethanol working fluid (Examples 6-12 of Table IV, Examples 18-24 of Table V and Examples 30-36 of Table VI). The PAG lubricants can contain random, block or reverse block EO/PO copolymers.

Example 37 and Comparative Examples V and W

These examples illustrate a further aspect of the present invention and demonstrates that the inclusion of a polyacrylate additive improves the viscosity stability of a polyalkylene glycol based lubricant even further when the lubricant is diluted with a 50/50 wt % water/EtOH blend. An example of the present invention is the formulation blend shown in Example 37 of Table VIII.

General Blending Procedure

Comparative Example V described in Table VIII is not a blended formulation. For the other two formulation blends described in Table VIII, a 300 mL glass beaker was used to prepare the blends. A 100 g batch of working fluid comprising a blend of 50 wt % water and 50 wt % EtOH was prepared.

A sample of 50 g of a blend of SYNALOX™ 50-100B containing 40 wt % of above mentioned working fluid was prepared and designated Comparative Example W. Then SYNALOX™ 50-100B was added the formulation until the solution was completely dissolved. The blend size was also 50 g.

Another sample of a formulation blend was first prepared which included SYNALOX™ 50-100B blended with 0.05 wt % polyacrylate at 60° C.

TABLE VIII

Results of Viscosity Tests of a Blend Containing Polyacrylate

| Formulation Blend | | Kin. visc. at 40° C. (mm²/s) | Kin. visc. change versus undiluted fluid |
|---|---|---|---|
| Comparative Example V | Synalox 50-100B (no blend) | 135.6 | — |
| Comparative Example W | 60 wt % Synalox 50-100B + 40 wt % EtOH/water (50/50 wt %) | 26.7 | −80% |
| Example 37 | 60 wt % Synalox 50-100B + 40 wt % EtOH/water (50/50 wt %) + 0.05 wt % Polyacrylate* | 86.6 | −36% |

*0.05% by weight polyacrylate is added to 99.95% by weight of a blend of lubricant and working fluid As described in Table VIII, when a working fluid is added at 40 wt % to a formulation blend (lubricant formulation), the viscosity of the lubricant formulation changes, i.e., the viscosity formulation is reduced by 80%. However, with the inclusion of a polyacrylate (0.05 wt %), the viscosity of the formulation blend is more stable and shows a significantly reduced viscosity change, i.e., there is only a 36% change in viscosity as described in Table VIII.

Polyalkylene glycols that are not soluble in aqueous alcohol mixtures are ineffective and outside the scope of the invention. For example the following polyalkylene glycol base oils (Table IX) and mixtures were evaluated for their solubility in a 50/50 weight/weight mixture of water and ethanol in which the water/ethanol mixture was added to the PAG at a concentration of 30% by weight and stirred for 5 minutes at ambient temperature.

TABLE IX

Properties of Various PAG Base Oils

| PAG Base Oil | Chemistry | Kinematic Viscosity at 100° C. (mm²/s) | Average M.W. (g/mol) | Viscosity Index |
|---|---|---|---|---|
| SYNALOX 100-120B | Polypropylene glycol mono-butylether | 30 | 2,300 | 216. |
| UCON OSP-220 | Dodecanol initiated random copolymer of propylene oxide and butylene oxide | 32 | 2,300 | 196. |

TABLE X

Solubility of Various PAG Base Oils

| PAG Base Oil | Solubility in a 50/50 weight/weight mixture of water and ethanol |
|---|---|
| SYNALOX 100-120B | Not soluble |
| UCON OSP-220 | Not soluble |
| DOWFAX ™ DF-107 | Soluble |
| DOWFAX ™ DF-117 | Not soluble |
| DOWFAX ™ 100N15 | Soluble |
| SYNALOX 100-120B (50%) SYNALOX 50-155B (50%) | Not soluble |

The SYNALOX 100-120B and UCON OSP-220 products described in Table XI are polymers that contain no ethoxy units and such polymers are not soluble in a 50/50 weight/weight mixture of water and ethanol. Dowfax DF-107 is an example of a copolymer that contains 14% by weight of ethoxy (from ethylene oxide) units; and, Dowfax DF-107 is soluble. Dowfax DF-117 is an example of a copolymer that contains 9% by weight of ethoxy (from ethylene oxide) units; and Dowfax DF-117 is not soluble. The above Examples illustrate that it is important for the copolymer to contain a sufficient amount of ethoxy units to provide a copolymer that is soluble in a working fluid comprising water and an alcohol. For example, the ethoxy units content of the copolymer of the present invention may be greater than or equal to 10% by weight in one embodiment, from greater than or equal to 10 wt % to about 30 wt % in another embodiment, and from greater than or equal to 10 wt % to about 90 wt % in another embodiment.

What is claimed is:

1. A process for converting heat energy into mechanical energy comprising the steps of:
   (a) providing a thermodynamic cycle;
   (b) providing an aqueous alcohol as a working fluid for the cycle;
   (c) providing a lubricant formulation for the cycle; and
   (d) controlling the kinematic viscosity of the lubricant formulation by using at least one polyalkylene glycol copolymer resin in the lubricant formulation; wherein the lubricant formulation contains an ethylene oxide as ethoxy units, $CH_2CH_2O$—, content of greater than about 10 weight percent.

2. The process of claim 1, wherein the lubricant formulation contains an ethylene oxide as ethoxy units content of greater than about 15 weight percent.

3. The process of claim 1, wherein the lubricant formulation contains an ethylene oxide as ethoxy units content of greater than about 30 weight percent.

4. The process of claim 1, wherein the kinematic viscosity of the lubricant formulation is from about 50 mm$^2$/s to about 300 mm$^2$/s at 40° C.

5. The process of claim 1, wherein the molecular weight of the at least one polyalkylene glycol copolymer is from about 500 g/mol to about 4,300 g/mol.

6. The process of claim 5, wherein the at least one polyalkylene glycol in the lubricant formulation includes at least one ethoxy, $CH_2CH_2O$—, unit and at least one propoxy, $CH_2CH(CH_3)O$—, unit.

7. The process of claim 1, wherein the copolymer is a random, block, or reverse block copolymer.

8. The process of claim 7, wherein the random copolymer has a molecular weight between about 500 g/mol and about 2,500 g/mol.

9. The process of claim 7, wherein the block or reverse block copolymer has a molecular weight between about 1,500 g/mol and about 5,000 g/mol.

10. The process of claim 1, wherein the lubricant formulation contains from about 0.01 weight percent to about 1 weight percent of a polyacrylate.

11. The process of claim 1, wherein the alcohol in the aqueous alcohol has a molecular weight of less than about 110 g/mol.

12. The process of claim 1, wherein the thermodynamic cycle is an organic Rankine cycle.

13. The process of claim 12, wherein the organic Rankine cycle is part of mobile equipment.

14. The process of claim 1, wherein the lubricant formulation is introduced into the expansion machine portion of the thermodynamic cycle.

15. The process of claim 14, wherein the expansion machine is selected from the group consisting of a piston expansion machine, an axial flow turbine, a radial flow turbine, a scroll-type expander, a rotary screw expander, a rotary-vane expander, and a Wankel expander, and combinations thereof.

16. The process of claim 15, wherein the piston expansion machine includes a swash plate design.

* * * * *